United States Patent [19]

Westdale

[11] 4,068,017

[45] Jan. 10, 1978

[54] COATED CARRIER PARTICLES FOR USE IN ELECTROPHOTOGRAPHIC PROCESS

[75] Inventor: Virgil William Westdale, Chagrin Falls, Ohio

[73] Assignee: Addressograph Multigraph Corporation, Cleveland, Ohio

[21] Appl. No.: 709,964

[22] Filed: July 30, 1976

[51] Int. Cl.[2] .......................... G03G 9/14; G03G 9/10; B32B 27/14

[52] U.S. Cl. .................................. 427/18; 252/62.1 P; 427/20; 427/216; 427/221; 428/404; 428/406; 428/407; 428/421; 526/5

[58] Field of Search ...................... 427/14, 18, 20, 215, 427/216, 220, 221; 252/62.1 P; 428/403, 404, 406, 407, 421, 411; 526/5; 260/42.14

[56] References Cited

U.S. PATENT DOCUMENTS

| | | | |
|---|---|---|---|
| 3,142,665 | 7/1964 | Cardinal et al. | 428/407 X |
| 3,595,944 | 7/1971 | Manning et al. | 428/421 X |
| 3,849,127 | 11/1974 | Madrid et al. | 252/62.1 X |
| 3,922,381 | 11/1975 | Datta | 252/62.1 X |
| 3,922,382 | 11/1975 | Kukla et al. | 252/62.1 X |

OTHER PUBLICATIONS

Research Disclosure, June 1974, pp. 35–36.

*Primary Examiner*—Harry J. Gwinnell
*Assistant Examiner*—Stuart D. Frenkel
*Attorney, Agent, or Firm*—Michael A. Kondzella

[57] ABSTRACT

Carrier particles for use in an electrophotographic process are prepared by applying a mixture of a perfluoro acid and polyvinylidene fluoride to the surface of the carrier particle. The resulting carriers are long lived, abrasion resistant and capable of imparting a high triboelectric charge to electroscopic powders mixed therewith.

10 Claims, No Drawings

COATED CARRIER PARTICLES FOR USE IN ELECTROPHOTOGRAPHIC PROCESS

BACKGROUND OF THE INVENTION

This invention relates to carriers for use in developer formulations which charge electroscopic powders triboelectrically. These carriers are useful in electrophotographic processes for developing latent electrostatic images in which a colored toner carried by the carrier particle is caused to be attracted from the carrier particle to develop the latent electrostatic image.

In the electrophotographic process it is necessary to use a carrier for the toner in order to produce an electrostatic charge upon the toner particles. Various kinds of developing processes are known including cascade, powder cloud and magnetic brush processes. In each of these processes it is necessary that the carrier used have certain triboelectric properties so that it is capable of imparting to the toner particles an electrostatic charge of the proper polarity and magnitude. Where uncoated carrier particles are used it has been necessary to select a toner having the desired triboelectric properties. Recently, it has been found that the carrier particles can be coated with various types of polymeric coatings to permit variation in the triboelectric properties thereof. One such method is disclosed in U.S. Pat. No. 3,811,880 to Luther C. Browning, assigned to the same assignee as this invention.

Although polymeric coatings of this type enable a certain degree of control of the triboelectric properties of the developer mix, it has been found that in use in the environment of electrophotographic reproduction machines such carrier particles are subject to aging which limits their effectiveness. Wearing away and removal of part of the polymeric coating upon the surface of the carrier particles is another problem encountered. This may result in undesired abrasion of the photoconductive surface used for imaging and also cause bias shorting.

Another problem inherent in the use of polymeric coatings for carrier particles is the phenomenon known as "bound toner." Through a mechanism which is not clearly understood prolonged usage of developer mixes including polymeric coated carrier particles results in toner being adhered onto the surface of the coated carrier causing a decrease in the effectiveness of the toning process and hence in the overall development of the images being reproduced.

A more recent development has been the use of perfluoro carboxylic acid coated carriers which impart a positive triboelectric charge to electroscopic powders with which they are mixed. However the abrasion resistance of such carriers leaves something to be desired.

OBJECTS

It is accordingly an object of this invention to provide carriers for toners which are not subject to the disadvantages mentioned above.

Another object of this invention is to provide carrier particles which have an enchanced abrasion resistance.

Another object of this invention is to provide carrier particles which are capable of imparting a high triboelectric charge to various types of toners.

Other objects and advantages of this invention will become apparent in the following detailed disclosure and description.

SUMMARY OF THE INVENTION

Chemically treated carrier particles in which the chemical treating agent is extended by means of a fluorinated polymer can be used in developer mixes in order to increase the useful life of the developer and also to provide desired triboelectric properties. A treatment for the purpose of adhering a mixture of a perfluoro carboxylic acid and polyvinylidene fluoride to the surface of a carrier matrix has been found to result in carriers having a longevity and an abrasion resistance which is significantly greater than untreated carrier particles or carrier particles coated with a perfluorocarboxylic acid itself. A carrier having low surface energy and a low coefficient of friction and a carrier which does not need to be replenished as frequently as other types of carriers is thereby provided. Such carriers are also capable of imparting a high positive triboelectric charge to electroscopic powders with which they are mixed.

DETAILED DESCRIPTION OF THE INVENTION

It has been found that the various problems encountered with previously available carriers are generally obviated by the use of a carrier particle to the surface of which is adhered a mixture of a perfluoro carboxylic acid or derivative thereof and polyvinylidene fluoride, which functions as an extender for the perfluoro acid as well as itself providing certain desirable properties.

The perfluoro carboxylic acids contemplated by this invention are those perfluorinated and substantially perfluorinated carboxylic acids, both aliphatic and aromatic, which have carbon chains of from 3 to 18 carbon atoms in length. Exemplary of such acids are perfluoropropionic acid, perfluorobutyric acid, perfluorovaleric acid, perfluoroadipic acid, perfluoroheptanoic acid, perfluorooctanoic acid, perfluorononanoic acid, perfluorodecanoic acid, 11-H-eicosafluoroundecanoic acid, as well as the higher molecular weight aliphatic acids and aromatic acids such as perfluorobenzoic acid. Polycarboxylic acids can also be used, for example, perfluorosuccinic acid or perfluoroglutaric acid. Derivatives of perfluoro carboxylic acids such as esters and amides can also be used.

The polyvinylidene fluoride used as an extender in this invention is a high molecular weight thermoplastic polymer of vinylidene fluoride. It is resistant to most chemicals and solvents including perfluoro carboxylic acid.

As carrier matrix materials it is possible to use a wide variety of substances, for example glass beads, ceramic beads, grains of sand or metallic particles. Non-metallic matrix materials are useful where a cascade development system is utilized although metallic matrices can also be used in cascade development. Where a magnetic brush developing system is used it is necessary that the matrix be magnetic. For this purpose various irons and steels have been used, for example, spherical steel beads and irregularly shaped iron powders.

The desired treatment of the carrier matrix material can be accomplished very simply. It is merely necessary to mix the carrier matrix material with a mixture of the perfluoro carboxylic acid and polyvinylidene fluoride in which the ratio by weight of polyvinylidene fluoride to perfluoro carboxylic acid is in the range of about 0.2:1 to 8:1, preferably about 2:1 to 3:1. Mixing can be accomplished in a Waring blender or other conventional mixer in a short time. It is desirable that the matrix material being used be thoroughly cleaned and dried prior to treatment with the perfluoro acid and polyvinylidene fluoride.

The resulting carriers are found to have a longer useful life than prior art carriers in the environment of electrophotographic development. Because these carriers have a low surface energy, reduced toner filming, characterized as "bound toner" is realized. In addition the mixture of perfluoro carboxylic acid and polyvinylidene fluoride adheres tenaciously to the carrier matrix material so that the resulting carrier is significantly more abrasion resistant than carriers treated with a perfluoro carboxylic acid alone.

Further, as pointed out above, the triboelectric properties of the carriers of this invention are such that most toners will be charged with a positive polarity when used with these carriers. Even polytetrafluoroethylene (Teflon) and polyethylene can be charged positively using the carriers of this invention. Since most commercially available toners are less electronegative than Teflon or polyethylene they are charged with a positive polarity almost without exception. In addition the charge imparted to the carriers of this invention is of a higher magnitude than that realizable using prior art carriers.

With the outstanding triboelectric properties of the carriers of this invention and the physical properties mentioned above, namely the low surface energy, the low coefficient of friction and their enhanced abrasion resistance these carriers represent a significant improvement over carriers which have been previously used. For example whereas a perfluoro carboxylic acid treated carrier may have a useful life of 10–11 hours the carriers of this invention have a useful life of 60–70 hours when used in a high speed electrophotographic copying machine. In addition to the long life of the carriers themselves the particular combination of properties increases the life of the photoconductor used in the electrophotographic process and also results in very high quality copies being produced.

This invention will be better understood by reference to the following examples which are intended to illustrate but not to unnecessarily limit the scope of this invention which is defined in the claims appended hereto.

EXAMPLE 1

A quantity of 6 grams of polyvinylidene fluoride commercially available as KYNAR 451 by Pennwalt Corporation and 3 grams of pentadecafluorooctanoic acid (perfluorooctanoic acid or PFOA) was mixed in a Waring blender. Powdered iron particles, +270 mesh, were washed in methylene chloride and dried and 1200 grams of the washed and dried particles were mixed with 1.8 grams of the blended polyvinylidene fluoride and PFOA in a roll mill for 1.5 hours. To the resulting mixture was then added 30 grams of a toner containing terpene phenol resin, polyamide resin and a negative orienting dye and tumbling was continued for 0.5 hour.

Copies made using the developer unit of an Addressograph-Multigraph Model 2300 had an acceptable background level and displayed a print density of 0.89.

EXAMPLE 2

The procedure of Example 1 was followed using a toner containing polyester resin and epoxy resin. Positive masters were made on an Addressograph-Multigraph Model 2300 duplicator and used to produce 2,000 copies of excellent image quality each.

EXAMPLE 3

The procedure of Example 1 was repeated using a toner containing polyamide, resin, maleic modified resin, lithium stearate and a negative orienting dye. Over 30,000 copies of excellent quality were produced using an Addressograph-Multigraph Model 5000 electrophotographic copier.

EXAMPLE 4

The procedure of Example 1 was repeated using a toner containing terpene phenol resin, polyamide resin, polycaprolactone resin and negative orienting dye. Positive masters having excellent density was produced on an Addressograph-Multigraph Model 2300 duplicator.

EXAMPLE 5

The procedure of Example 1 was followed using a toner containing styrene butyl acrylate resin, copolymers of vinyl toluene and δ-methylstyrene, carbon black and a negative orienting dye. Copies made on the Addressograph-Multigraph Model 2300 duplicator had clean background and excellent copy quality for about 1300 copies per master.

EXAMPLE 6

The procedure of Example 1 was repeated using a toner containing styrene acrylate resin, maleic modified rosin and carbon black. Over 7,000 positive copies per master with dense images and low background were produced on an Addressograph-Multigraph Model 2300 duplicator. Reversal copies were produced when the PFOA/polyvinylidene fluoride coating was omitted.

I claim:

1. A carrier for use in electrophotographic development of latent electrostatic images capable of inducing an electrostatic charge in a toner mixed therewith which comprises a member selected from the group consisting of metallic particles and siliceous particles to the surface of which is adhered a mixture of polyvinylidene fluoride and a member selected from the group consisting of perfluorinated and substantially perfluorinated carboxylic acids containing from 3 to 18 carbon atoms and esters and amides thereof, said polyvinylidene fluoride and acid being present in a ratio by weight of about 0.2:1 to 8:1.

2. A composition according to claim 1 wherein said polyvinylidene fluoride and acid are present in a ratio by weight of about 2:1 to 3:1.

3. A composition according to claim 1 wherein said acid is perfluorooctanoic acid.

4. A composition according to claim 1 wherein said electrostatic charge is of positive polarity.

5. A composition according to claim 1 wherein said particles are non-magnetic.

6. A composition according to claim 1 wherein said particles are magnetic.

7. A composition according to claim 1 wherein said particles are iron.

8. A process for developing a latent electrostatic image which comprises mixing an electroscopic powder with a carrier according to claim 1 to impart opposite electrostatic charges to said electroscopic powder and said carrier, whereby said electroscopic powder is attracted to said carrier and transferring said electroscopic powder from said carrier to said latent electrostatic image.

9. A process according to claim 8 wherein said transferring step is accomplished by means of cascade development.

10. A process according to claim 8 wherein said transferring step is accomplished by means of magnetic brush development.

* * * * *

UNITED STATES PATENT OFFICE
CERTIFICATE OF CORRECTION

Patent No. 4,068,017 Dated January 10, 1978

Inventor(s) Virgil W. Westdale

It is certified that error appears in the above-identified patent and that said Letters Patent are hereby corrected as shown below:

Column 4, line 6, after "polyamide" delete the comma.

Signed and Sealed this

*Thirteenth* Day of *June 1978*

[SEAL]

*Attest:*

RUTH C. MASON
*Attesting Officer*

DONALD W. BANNER
*Commissioner of Patents and Trademarks*